United States Patent Office 2,837,813
Patented June 10, 1958

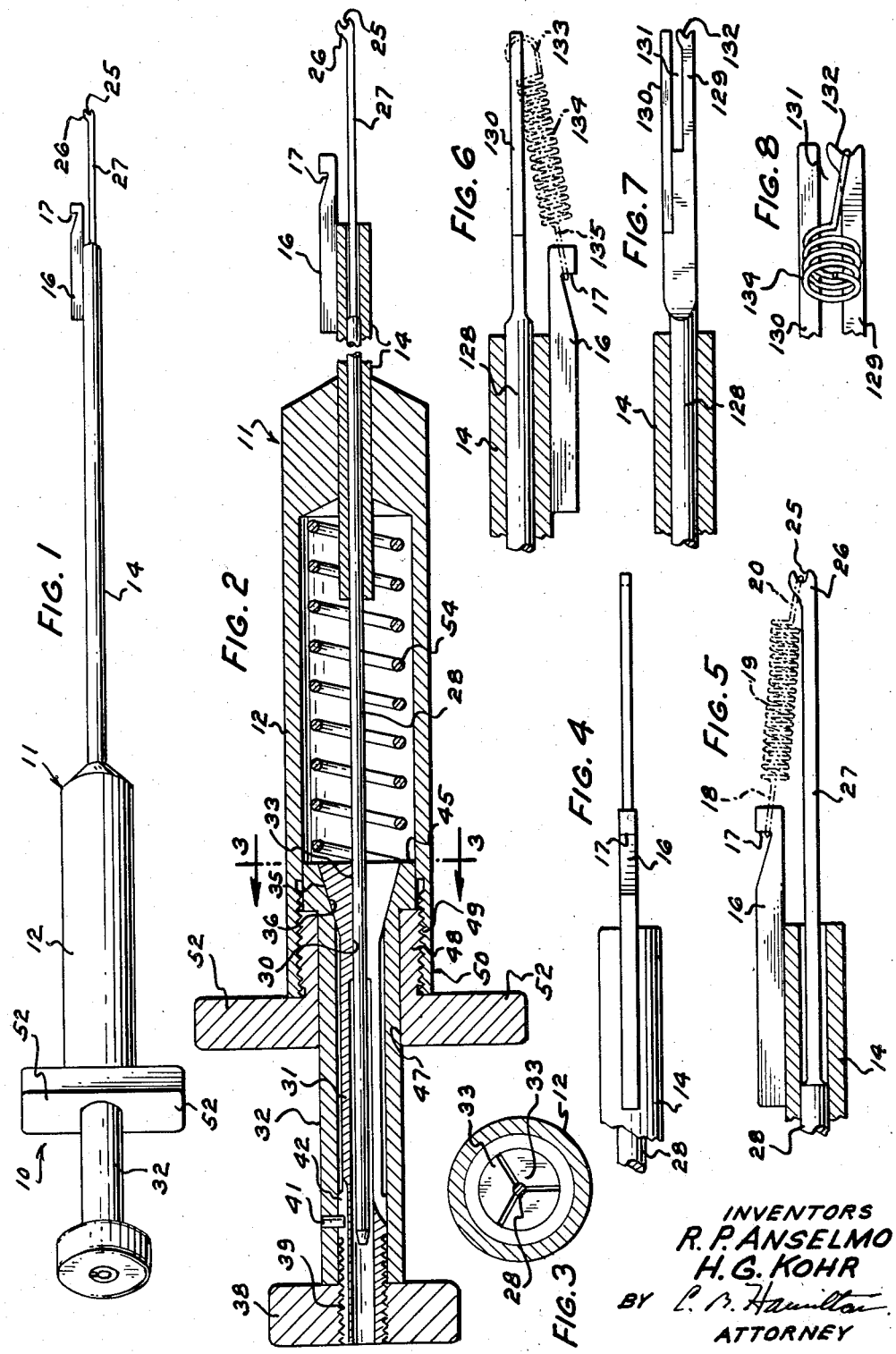

2,837,813

DEVICE FOR INSTALLING HELICAL SPRINGS

Roy P. Anselmo, Franklin Park, and Hilton G. Kohr, Chicago, Ill., assignors to Western Electric Company, Incorporated, New York, N. Y., a corporation of New York Application July 21, 1954, Serial No. 444,836

3 Claims. (Cl. 29—227)

This invention relates to a tool for extending and installing springs and more particularly to a device adjustable to helical springs of different lengths for installing them onto closely grouped parts of a mechanism.

An object of the invention is to provide a tool for stretching and installing helical springs.

A further object of the invention is to provide a device adjustable to helical springs of various lengths for applying them to relatively inacessibe parts.

A device illustrating certain features of the invention may include a tubular member having an enlarged portion at one end and a reduced portion at the other end, on the latter of which is mounted a hook for engaging the loop of a helical spring, and a rod slidably mounted for longitudinal movement in the reduced portion of the tubular member has a hook on one end engageable with the loop of the other end of the spring. The other end of the rod is slidably engageable in the bore of a collet mounted within a sleeve and having a threaded handle member for tightening the collet into gripping engagement with the rod for securing the rod in adjusted position thereto for movement therewith. The sleeve is slidably mounted in the enlarged portion of the tubular member for longitudinal and rotary movement and is urged longitudinally to a normal retracted position by a spring within the enlarged portion of the tubular member and finger grips on the enlarged end of the tubular member and the handle on the sleeve may be engaged by the operator and the device manipulated to expand the spring and to transfer the loops on the ends thereof onto the parts to which they are to be connected.

Other objects and advantages of the invention will become apparent by reference to the following detailed description thereof and the accompanying drawings illustrating a preferred embodiment, in which Fig. 1 is a perspective view of a device for expanding and installing springs;

Fig. 2 is an enlarged longitudinal sectional view through the device;

Fig. 3 is a cross-sectional view taken on the line 3—3 of Fig. 2;

Figs. 4 and 5 are enlarged fragmentary views of the hook portions of the device; and Figs. 6, 7, and 8 are fragmentary views of a modified form of hook construction.

Referring to the drawings the device or tool 10 for expanding and installing helical springs comprises a tubular body member 11 having an enlarged cylindrical end portion forming a housing 12, and a reduced portion formed by a tube 14 brazed to the enlarged housing 12. A hook 16 is bonded to the end of the tube 14 and has a V-shaped notch 17 therein for receiving a loop 18 on one end of a helical spring 19 for supporting the loop against longitudinal movement to the right as viewed in Fig. 2.

A loop 20 which is disposed at the other end of the spring 19 in parallel relation to the loop 18 is adapted to engage in a notch 25 of a hook 26 formed on the reduced end portion 27 of a rod 28 which is slidably mounted for longitudinal movement in the bore of the tube 14. The other end of the rod 28 is slidable in a bore 30 of a collet member 31 mounted within a sleeve 32 and having a plurality of gripping jaws 33 engageable with the rod 28 for releasably securing the rod thereto in longitudinally adjusted position. The gripping jaws 33 have outer conical cam surfaces 35 thereon which engage a conical cam surface 36 on the sleeve 32 for actuating the gripping jaws in response to longitudinal movement of the collet member 31 relative to the sleeve 32, which is accomplished by an enlarged annular handle or finger grip 38 having a threaded aperture engageable with a threaded end portion 39 on the collet member 31. A key or pin 41 on the sleeve 32 rides in a keyway 42 in the collet member 31 to prevent relative rotation therebetween.

An enlarged cylindrical end 45 of the sleeve 32 is longitudinally slidable within the housing 12 of the tubular member 11 and the sleeve 32 has a reduced cylindrical shank slidably supported in a bore 47 of a bushing 48 having external threads 49 engageable with the internally threaded end portion 50 of the housing 12. A pair of finger grips or handles 52 extend in diametrically opposed relation to each other from one end of the bushing 48. A helical expansion spring 54 within the housing 12 yieldably maintains the sleeve 32 and the collet member 31 and the rod 28 carried thereby to a normal retracted position as shown in Fig. 2.

The device 10 is adjustable to accommodate springs of various lengths. In using the device the handle 38 of the device may be rotated relative to the sleeve 32 to release the collet and permit free movement of the rod 28 which is then longitudinally adjusted to position the hook 26 thereon a distance from the notch 17 of the hook 16 slightly greater than the length of the spring 19 which is to be installed. The handle 38 is then tightened to actuate the collet to grip the rod 28 and lock it in fixed relation to the sleeve 32, after which the spring 19 may be applied to the hooks 16 and 26. The loop 18 of the spring 19 is placed in the notch 17 of the hook 16 and the loop 20 of the spring is placed in a notch 25 of the hook 26, the spring 19 being slightly expanded when applied to the hooks, which serves to yieldably maintain it in position on the device.

With the spring applied to the hooks 16 and 26 of the device of the operator may engage the finger grips 52 with a pair of fingers of one hand and engage the handle 38 with the thumb and with the device thus gripped, the operator may insert the forward end of the device with the spring 19 thereon into the area where the spring is to be applied and align one of the loops, as for example, the loop 18 with the pin or aperture of a part to which the springs is to be applied, and by the proper movement of the device cause the loop 18 to be connected thereto and disengaged from the hook 16 on which it was supported. The sleeve 32 may then be advanced by pressure of the thumb on the handle 38 to cause the rod 28 and the hook 26 to be extended to expand the spring and the device is moved to position the loop 20 thereof in close proximity to the pin or aperture of another part on which the loop 20 is to be attached and the device is again manipulated to effect the transfer of the loop 20 from the hook 26 onto a part.

In a modified embodiment of the invention the construction of the device is identical to the previously described embodiment except for the rod 128 (Figs. 6, 7, and 8) which corresponds to rod 28 of the other embodiment and has its forward end flattened and shaped to provide a pair of parallel fingers 129 and 130 spaced apart by a slot 131. One end of the finger 129 has a laterally extending portion forming a hook 132 with a V-shaped notch therein for receiving a loop 133 of a helical spring 134, the loop 135 on the other end of which is disposed at right angles to loop 133 and is engageable in the notch 17 of the hook 16. The spring 134 is attached to the device 10 by first engaging the loop 133 with the hook 132 and with the portions of the spring adjacent the loop 133 disposed in the slot 131 and in engagement with the fingers 129 and 130, after which the loop 135 thereof is applied to the hook 16, which has previously been rotated to position it substantially in a plane perpendicular to the face of the fingers 129 and 130. The spring 134, with a portion thereof resting in the slot 131 in engagement with the fingers 129 and 130, is held by the fingers against lateral rolling movement and with the loops 133 and 135 thereof positioned so that they may be readily transferred from the hooks 132 and 16 onto the parts to which they are to be connected.

With the hook 26 or 132 axially and rotatably adjustable relative to the hook 16, it will be seen that the device 10 is adapted to support and install springs which are of various lengths and which have their end loops disposed in any angular relationship to each other.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for applying helical springs comprising a tubular member having an enlarged portion at one end and a reduced portion at the other end with a hook thereon engageable with the loop on one end of a helical spring, a rod extending through and mounted for sliding movement in the reduced portion of said tubular member and having a hook on one end thereof outside of the tubular member engageable with the loop on the other end of said spring, a sleeve mounted for longitudinal and rotary movement within the enlarged portion of said tubular member and having a collet supported thereby for releaseably gripping said rod for movement therewith relative to the tubular member, resilient means mounted within said enlarged portion of the tubular member for urging said sleeve and collet to a normal retracted position to dispose the hooks in a predetermined spaced relation to each other, and means for effecting relative movement between said tubular member and said sleeve to vary the longitudinal position of the hooks relative to each other.

2. A device for applying helical springs comprising a tubular member having an enlarged portion at one end and a reduced portion at the other end with a hook thereon engageable with the loop on one end of a helical spring, a rod extending through and mounted for sliding movement in the reduced portion of said tubular member and having a hook on one end thereof outside of the tubular member engageable with the loop on the other end of said spring, a sleeve mounted for longitudinal and rotary movement within the enlarged portion of said tubular member and having a collet supported thereby for gripping the rod for movement therewith, resilient means mounted within said enlarged portion of the tubular member for urging said sleeve and collet to a predetermined normal position to dispose the hooks in a predetermined spaced relation to each other, means for effecting relative movement between said tubular member and said sleeve to vary the longitudinal position of the hooks relative to each other, and means on said rod adjacent the hook thereon having surfaces engageable with circumferentially spaced portions of a spring suspended between said hooks for supporting said spring against rolling movement.

3. A device for applying helical springs comprising an elongated tubular member having a hook on one end engageable with a loop on one end of a helical spring and having an enlarged portion at the other end, a rod mounted for sliding movement in said tubular member and having one end projecting therefrom and provided with a pair of laterally spaced axially disposed fingers for supporting the helical spring against rolling movement, one of said fingers being shaped to receive and support a loop on the other end of said spring, a sleeve mounted for rotation and for longitudinal movement within the enlarged portion of said tubular member to and from a normal retracted position, a chuck mounted on said sleeve for adjustably gripping said rod for movement therewith, resilient means for urging said sleeve and said chuck to said normal retracted position to dispose said hook and said fingers in a predetermined longitudinally spaced relation to each other, and handle means on said tubular member and said sleeve for effecting relative movement between said tubular member and said sleeve to expand said helical spring.

References Cited in the file of this patent

UNITED STATES PATENTS

| | | |
|---|---|---|
| 24,354 | Merritt | June 7, 1859 |
| 430,186 | Johnson | June 17, 1890 |
| 1,466,992 | Craun | Sept. 4, 1923 |
| 1,951,953 | Tollonitsch | Mar. 20, 1934 |
| 2,160,652 | Feigh | May 30, 1939 |
| 2,329,286 | Meyer | Sept. 14, 1943 |
| 2,465,030 | Myers | Mar. 22, 1949 |